Jan. 19, 1954  C. L. FLINDT  2,666,219
SOLE ROUNDING AND TRIMMING MACHINE
Filed Oct. 12, 1948  2 Sheets-Sheet 1

FIG. I.

INVENTOR
Charles L. Flindt

Jan. 19, 1954 C. L. FLINDT 2,666,219
SOLE ROUNDING AND TRIMMING MACHINE
Filed Oct. 12, 1948 2 Sheets-Sheet 2

INVENTOR
Charles L. Flindt

Patented Jan. 19, 1954

2,666,219

UNITED STATES PATENT OFFICE 2,666,219

SOLE ROUNDING AND TRIMMING MACHINE

Charles L. Flindt, San Jose, Calif.

Application October 12, 1948, Serial No. 54,007

8 Claims. (Cl. 12—88)

This invention relates to machines for rounding and trimming the soles of shoes. The objects of this machine are, first, to improve that branch of sole trimming which employs a concave circular blade to do the cutting, and more particularly to improve the technique as set forth in the patent granted to me January 20, 1948, No. 2,434,739, for Sole Trimming Machines.

It has been found desirable that means should be provided which make quick changing of blades possible. In the patent referred to, blade changing involves several time consuming operations. Also experience has disclosed that when the concave side of the cutter is more shallow than shown in the said patent, less difficulty is encountered in disposing of the cut off surplus materials; also the shallow saucer shaped cutter as herein shown is easier and less expensive to manufacture on a production basis. The desirability of incorporating quick blade changing means was started by the discovery that different types of teeth in the cutting rim of the blade have been found as best suited for the various materials used for shoe bottoms in a shoe factory; for instance, when cutting crepe rubber a fine toothed knife edge blade surpasses all others for effectiveness. The blade for cutting rubber, Fig. 3, makes a smoother cut because of its knife like edge, but may become overheated at high speeds because of friction with the walls of the material being cut. To offset this difficulty a constant drip of water on the blade as it cuts is the usual practice. In the present invention the spreader 39 is provided to reduce heat producing friction; it enters the cut made by the blade and besides enlarging the width of the cut it places a strain on the material being cut at the point where the knife edge is engaging the work. This makes for more effective cutting and reduces friction on the blade which in excess can damage the temper of the blade and reduce its length of life.

Figure 10:
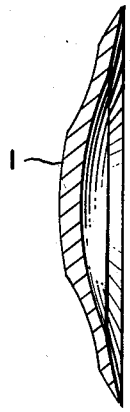

It is customary in saw practice to set the teeth of the blade in order to provide clearance for that part of the blade following the teeth in the cut; in Fig. 10, I provide a blade with reduced thickness back of the teeth thereof in order to reduce friction at high speeds.

It is important that friction between the work and the blade be reduced for it is not always desirable to use the water drip method to attain this end, therefore the claims for this invention in part, will be directed toward means for reducing friction as stated and more than one method is herein depicted. When cutting heavy leather soles a coarse saw blade is best. In both instances the cooperating edge past which the blade is rotated, plays an important part in the results obtained.

Precision of blade construction with respect to the shape of the teeth and the true contour thereof, and also the requirement that the temper of the blade material shall insure a maximum of wearing quality in the cutting performance thereof, and further that the mounting means for the blades shall preserve the blade precision and make possible accurate work at high speeds, are further objectives in this application. Toward these ends the specifications and claims direct their coverage.

One of the advantages obtained by the use of a concave circular blade in trimming soles, is the fact that the trim in the shank of the shoe bottom is easily accomplished as the cutter follows the curves of the shank section. As shown in the drawings, the tread surface of the shoe sole rides on a roller support which carries a cooperating edge that acts with the blade in severing the excess overhang of a shoe sole, and the convex side of the cutter operates adjacent to the shoe and accordingly fits the curves of the shank of the sole when cutting, while at the same time because of its shape allows closer entry toward the shoe when the said shank curves are being trimmed.

It will be noted that the work supporting roller guides the work against the blade at a point well below the axis line of the blade. This arrangement provides better cutting facilities than that of the former cited patent principally because the teeth of the blade pull the work toward the blade and make unnecessary complicated work feeding mechanism.

An ordinary circular blade without the convex feature explained would bind and cause a distorted cut and an inaccurate result when cutting curves, as well as failing to allow clearance for the top of the blade as it moved past the shoe upper when the machine operator sought to trim close in the shank section of the shoe bottom. The cutter therefore, should properly be termed a concavo-convex circular blade; and the convex feature is the most important for the reason that a fair result might be obtained on some kinds of work without the blade necessarily being concave. The convex shape however is indispensable.

Figure 1:
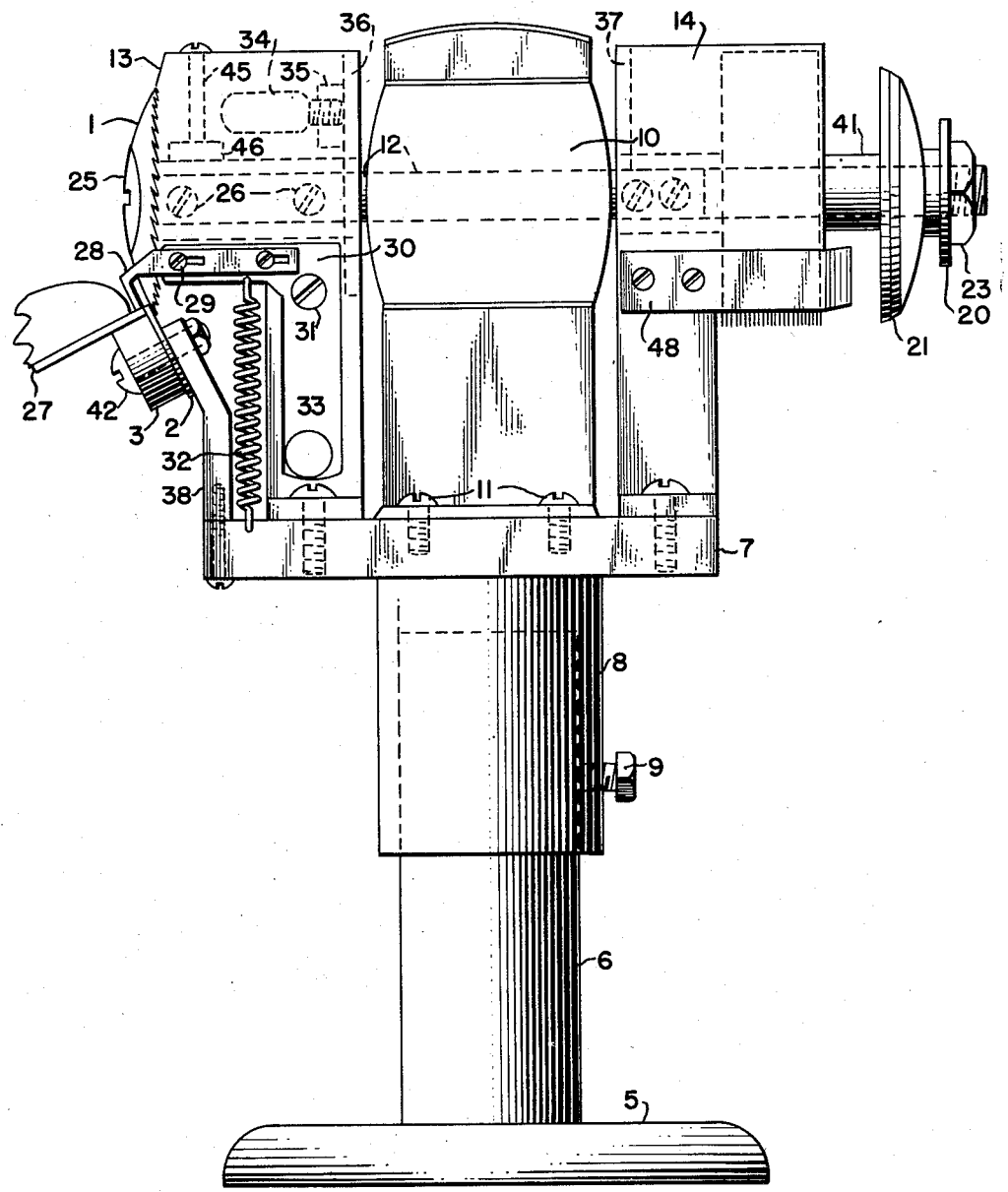
Figure 2:
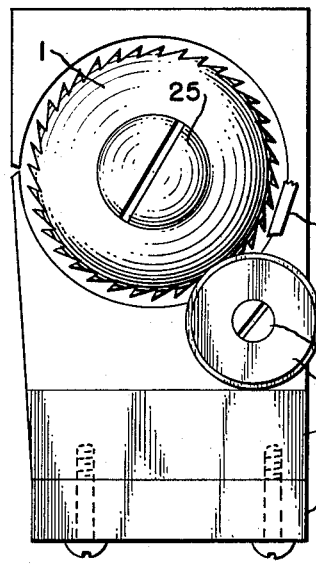
Figure 3:
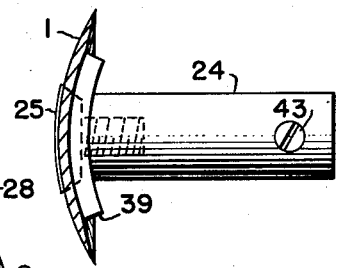
Figure 4:
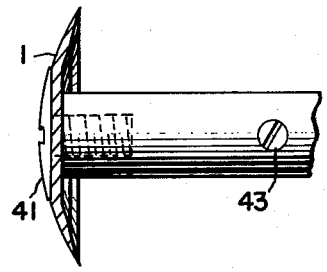
Figure 5:
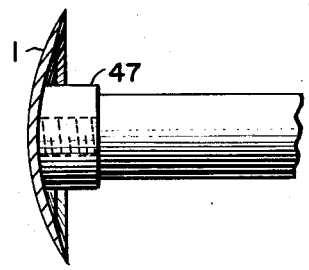
Figure 6:
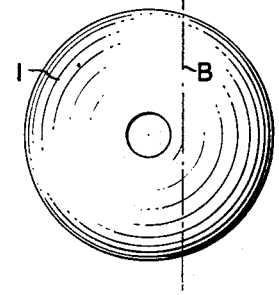
Figure 7:
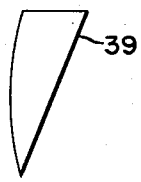
Figure 8:
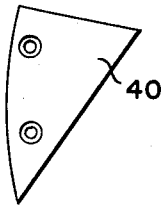
Figure 9:
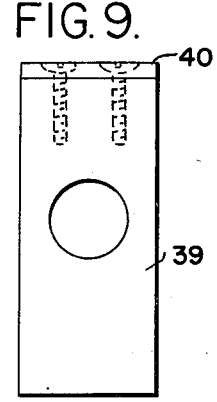

As previously explained it is desirable that effective and quick means for attaching the cutters to the rotating means be provided and inasmuch as this feature is being covered in basic terms in the claims, three methods of accomplishing this objective are shown in the drawings. Figure 1 is a front view of the machine. Figure 2 is a side view of part of the machine showing a concavo-convex circular blade. Figures 3, 4 and 5 are sections of blades cut at line B of Figure 6, and illustrate alternative methods of attaching blades to their carriers. Figure 6 is a side view of a blade. Figures 7, 8 and 9 are detail views of a cut spreader for facilitating the trimming of hard sole leather. Figure 10 is an enlarged view of a section of a blade showing reduced blade thickness behind the teeth.

In Figure 1, base 5, column 6, table 7 and sleeve 8, constitute the support for the machine; sleeve 8 fits the column in sliding relation thereto and by using set screw 9 adjustment can be made at any height from the floor that the machine operator may elect.

The electric motor 10 bolts to the table with screws 11 and has a shaft 12 projecting from each end. Housing for the blade carrier assembly on the left side of the motor is indicated by the numeral 13, while on the right side of the motor housing 14 indicates a protector for the operator of the machine from possible injury to his hands caused by the bristles of wire brush 15. Both of these housings are bolted to table 7, by screws 17 and 18 respectively.

The trimming of shoe soles and heels is done with blade 1, of Figure 3, which is the preferred form. The blade is secured to its carrier 24 by countersunk screw 25 which carries a left thread; this is necessary for the reason that the movement of the blade is clockwise and the resistance to cutting continually exerts a pressure to unloosen a right thread screw.

Two alternative methods of attaching blades to their carriers are shown in Figures 4 and 5. In Figure 4, nut 41 secures the blade on to a stem integral with the carrier, while in Figure 5 a threaded nut built into the blade allows the stem on the carrier to screw into it in accurate relationship. As previously explained under the general objectives of this application, several advantages exist making it desirable to have means for separating the blades from their carriers quickly.

In Figure 4 a variation of the concavo-convex form of the blade is used in order to allow room for nut 41 within the periphery line of a completely convex surface. The blade carrier 24 is attached to motor axis 12 with screws 43.

The shoe sole 27 rides on roller 3 and cooperating edge 2, and is drawn toward the cutter blade by the shape of the teeth thereon. This feeding of the work is assisted by the roller 3 on which the work rides. The roller is ball bearing and because of being positioned with its axis line further forward than the path of the blade, the pull of the blade teeth on the work exerts a maximum effect to feed the work.

The presser foot 28 is attached in adjustable lateral relation to the blade by screws 29 which secure it to triangle member 30. This member is pivoted to housing 13 by screw 31, and operates to control presser foot 28 on the work in self adjusting relationship on different thicknesses of soles by spring 32. This spring stretches between member 30 and table 7, and the machine operator uses knob 33 to facilitate presser foot control when he desires to raise the foot for introducing heavier soles or for removing the work from the machine. The pressure exerted by the spring on the presser foot is not great but experience has shown that a fair degree of pressure can be used without interfering with the feed of the work, because of the fact that the line of cut by the blade is below its axis line and when the teeth in the blade carry a hook shape, a strong feeding tendency is present. The aforesaid lateral adjustable feature of the presser foot 28 is for use in determining the amount of overhang the finished shoe bottom will have. In practice the operator rides the shoe bottom on the supporting roller and holds the upper of shoe, just above the welt line thereof, against the lower edge of the presser foot to in this way insure a uniform sole extension all around the periphery of the shoe.

A lamp 34 is housed in housing 13, and screws in socket 35 which attaches to closure 36. These closures 36 and 37 fit inside housings 13 and 14, and have for their function the preventing of leather dust from entering the insides of the motor. Openings large enough to permit operation of the motor shaft through them are provided.

The said lamp is located at a proper position to throw light where needed to enable the machine operator to have complete visibility of every cutting movement of the blade.

In Figure 2 it will be seen that complete protection for the machine operator is provided against possible accidental injury from the blade by the edge of housing 13 at the top and extension 38 which attaches to table 7 with screws. Roller 3 attaches with screw 42 to extension 38. The presser foot 28 besides enabling different thicknesses of soles to be held in operating position also serves to protect the machine operator and especially the upper of the shoe when the arches of the shoe sole shank are being cut.

Referring again to Figure 3, it will be seen that screw 25 besides holding the blade to its carrier 24, also secures spreader 39 which is concaved to fit the blade in accurate relation. One end of this spreader appears as shown in Figure 7 and its function is to spread the cut made by the blade. This follows for the reason that the lower section of this end enters the cut in the work and wedges it wider while the other end of the spreader carries a knife 40 which attaches with screws to the spreader, and operates to cut the edges of the surplus overhang and make it easier to bend away from the blade.

At high speeds it is desirable that the cut off surplus shoe bottom be held away from the blade in part, at least, for some materials may smoke or heat the blade caused by friction, in case contacts are too close between the blade and the cut off surplus.

It is apparent that the said cutter 40 could be made to sever successively in small pieces the entire surplus overhang that is cut off. A larger cutter would have to be provided and a cooperating edge would be necessary past which the cutter operated in joint action with the edge. This arrangement is not considered necessary and accordingly is not claimed.

In Figure 1 is shown bolt 45 which is secured in housing 13 near its top and at its lower end secures bearing 46 in light contact with the blade carrier. This bearing prevents the shaft 12 from springing away from normal close clearance past work support roller 3, when a particularly hard piece of material is being cut, and the stress is great.

Applicant contemplates the desirability of filing an application for patent embracing a concavo-convex circular blade in form, and structure quickly mountable on or demountable from a rotary shaft; he discloses herein subject matter he desires to incorporate in a later application for patent.

In Figure 10 an enlarged section of a blade shows reduced blade thickness behind the teeth thereof; this feature permits blade clearance in the cut made without undue friction, and promotes easier feeding of the work, somewhat similarly as does the customary setting of the teeth in general saw practice.

Having described my invention what I claim as new and desire to secure by Letters Patent is:

1. The combination in a shoe sole trimming machine of, shoe sole supporting and guiding devices, an arcuate shaped blade for removing the excess overhang of a shoe bottom, and a motor driven rotary member mounted to enter the cut made by the blade and enlarge the width thereof for separating part of the said excess overhang from friction producing contact with the blade during the cutting operation.

2. The combination in a shoe sole trimming machine of, shoe sole supporting and guiding devices, a rotary blade mounted to trim off the excess overhang of a shoe bottom, and a second cutting unit mounted to cut the excess overhang for facilitating its disposal and reduce trimming blade friction therewith.

3. The combination in a shoe sole trimming machine, of a motor driven concavo-convex rotary circular blade with a series of teeth in the cutting rim of the blade for assisting in the cutting function and for accelerating the feed of the work to the cutter, and a roll for supporting the work having a face adjacent the cutting rim of the blade with an edge overlapping the periphery of the cutting rim of the blade for cooperative action with the blade in producing a smooth cut of the work when the blade rotates past the said edge.

4. The combination in a shoe sole trimming machine of, a rotary blade having a convex face and a series of teeth in the cutting rim thereof, a motor and means connecting the blade to the motor in rotation relation, mounting means for the blade with the axis line thereof at an acute angle to the direction of cut of the blade, a rotary work support mounted to sustain a shoe sole and ride the sole against the blade to produce a uniformly near right angle cut to the tread surface thereof, and a presser foot operating alongside the blade for guiding and holding the work.

5. The combination in a shoe sole trimming machine, of a circular blade with a convex side, a motor, means connecting the blade with the motor in rotation relationship, a work supporting roller, a cooperating edge on the said roller for assisting the blade in severing the excess overhang of a shoe bottom, and a presser foot operating alongside the said blade in self adjusting relation to hold the materials together while trimming.

6. The combination in a shoe sole trimming machine, of a rotary circular blade, a support for a shoe, a cooperative edge located adjacent the said blade for assisting the blade in severing the excess overhang of a shoe sole with a clean cut when the blade is rotated past the said edge, means for holding different thicknesses of soles on the support, a guard for interposing between the blade and the upper of the shoe for protecting same from possible damage by the blade, and cutting means positioned to cut the said excess overhang material with a cut at an angle to the cut made by the rotary blade for facilitating the disposal of the excess cut off material.

7. The combination in a shoe sole trimming machine, of sole supporting and guiding devices, a blade shaped in arcuate form and mounted to enable close entry toward the shoe when the shank of the sole is being trimmed, a cooperative edge located adjacent the cutting rim of the blade in position to assist the blade in severing the excess overhang of a shoe sole when the blade moves past the said edge, and cutting means in position to cut the said excess material with a cut at an angle to the cut made by the blade for facilitating the disposal of the cut off excess material.

8. The combination in a shoe sole trimming machine, of an electric motor, a rotary circular blade with a convex face, means connecting with the motor to the blade in rotating relationship, a work supporting roller having a cooperative edge located adjacent the said blade rim for joint action with the blade in severing the excess material with a clean cut, a guard for interposing for protecting the upper from possible blade injury, means for demounting the blade from the motor in one operation, and means for gauging the extent of the sole overhang remaining on the shoe after the excess is removed.

CHARLES L. FLINDT.

References Cited in the file of this patent

UNITED STATES PATENTS

| Number | Name | Date |
|---|---|---|
| 1,061,356 | Carter | May 13, 1913 |
| 1,474,353 | Fowler | Nov. 20, 1923 |
| 1,576,835 | Littlefield | Mar. 16, 1926 |
| 1,591,012 | Brogan | July 6, 1926 |
| 1,600,344 | Lenz | Sept. 21, 1926 |
| 1,869,434 | Merrick | Aug. 2, 1932 |
| 2,051,333 | Flindt | Aug. 18, 1936 |
| 2,434,739 | Flindt | Jan. 20, 1948 |